United States Patent Office 3,825,433
Patented July 23, 1974

3,825,433
HYDRAULIC BINDER
Alfred Schneider-Arnoldi, Krefeld, Hellmut Gäbler, Morlenbach, near Weinheim an der Bergstrasse, and Joachim Kandler, Lechenich, Germany, assignors to Knapsack Aktiengesellschaft, Knapsack, near Cologne, Germany
No Drawing. Continuation of abandoned application Ser. No. 711,875, Mar. 11, 1968. This application Dec. 30, 1970, Ser. No. 102,944
Claims priority, application Germany, Mar. 22, 1967, K 61,792
Int. Cl. C04b 7/02, 7/14
U.S. Cl. 106—89                                  2 Claims

ABSTRACT OF THE DISCLOSURE

Production of a cement-based hydraulic binder containing from 10 to 80% by weight, preferably from 15 to 70% by weight, slag ground to cement fineness and originating from the electrothermal production of phosphorus, and use of the hydraulic binder for making massive concrete.

---

This application is a continuation of applicants' parent application U.S. Ser. No. 711,875, filed Mar. 11, 1968, copending herewith and now abandoned.

The present invention relates to a cement-based hydraulic binder.

The binders used in concrete generally comprise Portland cement or blast-furnace cement. The starting materials used for making Portland cement comprise natural minerals, such as limestone, clay, clay marl or lime marl, and calcium sulfate, which are intimately mixed and then calcined, for example in a rotary kiln. After grinding to the desired fineness, there is obtained a so-called hydraulic binder which hardens in contact with water. Blast-furnace cement is produced from material, wherein the natural minerals are partially replaced by quenched blast-furnace slag which also has latent hydraulic properties.

A property characteristic of conventional standard cements is their ability to harden relatively rapidly, the hardening being substantially complete after 28 days. Blast-furnace cement has more particularly been found to be subject to a certain degree of after-hardening which, however, is of substantially no interest for practical purposes.

To be suitable for making massive concrete, i.e. for the production of large-dimensioned concrete bodies, it is an important requirement for the setting cement to have no more than a fair heat-evolution rate per unit of time. Failing this, the concrete mass would be subject to internal stress and possible cracking. As a result of its lower hardening velocity, blast-furnace cement has a heat evolution rate per unit of time slightly lower than that of Portland cement which, however, is still high enough to produce deleterious effects.

Attempts have already been made separately to grind blast-furnace slag to cement fineness and to add the ground slag to Portland cement on the construction site, but this entails disadvantages, these being the same as those reported above.

Natural puzzuolanes, for example trass, whose special properties make it an additive very suitable for use in water-proof concrete, have been found to behave in a similar manner.

The electrothermal production of phosphorus from phosphates is known to entail the formation of slag, which is called hereinafter "phosphorus furnace slag" and has a chemical composition different from that of Portland cement or blast-furnace slag, with respect to its individual constituents.

Phosphorus furnace slag has long been held to be unsuitable for the production of hydraulic binders, particularly in view of the very slight proportions of aluminum oxide contained therein. Typical of phosphorus furnace slag is, for example, the following composition:

|  | Percent |
|---|---|
| CaO | 48 |
| $SiO_2$ | 42 |
| $Al_2O_3$ | 2.8 |
| MgO | 0.3 |
| $Fe_2O_3$ | 0.3 |
| F (bound) | 3.0 |
| S (bound) | 0.4 |
| $P_2O_5$ | 1.5 |

Cement, more particularly Portland cement, containing from 10 to 80% by weight, preferably from 15 to 70% by weight, of slag, ground to cement fineness and originating from the electrothermal production of phosphorus, has now unexpectedly been found to be a hydraulic binder very suitable for use in massive concrete. In concrete produced with the hydraulic binder of the present invention, the increase in strength occurs more slowly than in concrete made with pure Portland cement or blast-furnace cement, but this is accompanied by an extremely long after-hardening period for the concrete, which is unexpectedly substantially longer than that of concrete produced with standard cements and incomplete even after 360 days.

It has been found that concrete made with the binder of the present invention has a strength greater than that of concrete produced with pure Portland cement, after 360 days. However, the most important property of the hydraulic binder of the present invention resides in the fact that concrete produced therewith has a heat-evolution rate considerably lower, particularly during the first days, than that of concrete produced with standard cements. In other words, the concrete mixtures so made are of considerable interest for the production of concrete bodies having large dimensions.

The phosphorus furnace slag can be mixed with the Portland cement either by grinding the two binder components separately and then mixing them, or by grinding the phosphorus furnace slag together with the Portland cement clinker. No difference in the strength of the concrete has been observed.

It has already been proposed to use foamed phosphorus furnace slag as an additive in the production of building materials, particularly lightweight concrete. However, this is granular phosphorus furnace slag which has no hydraulic properties. With this in mind, it is all the more an unexpected result that ground phosphorus furnace slag does possess such hydraulic properties.

EXAMPLE 1

Phosphorus furnace slag having the following composition:

|  | Percent |
|---|---|
| CaO | 48 |
| $SiO_2$ | 42 |
| $Al_2O_3$ | 2.8 |
| MgO | 0.3 |
| $Fe_2O_3$ | 0.3 |
| F (bound) | 3.0 |
| S (bound) | 0.4 |
| $P_2O_5$ | 1.5 | was ground so as to have a Blaine-index of 3470 sq. cm./gram and then mixed with Portland cement "PZ 275," which had a Blaine-index of 2490 sq. cm./gram, in the ratio of 1 part phosphorus furnace slag to 2 parts Portland cement. The symbol "PZ 275" stands for a Portland cement with a crushing strength of at least 275 kg./sq. cm. after a hardening period of 28 days.

The following test data were obtained. The test data for "PZ 275" are indicated for the purpose of comparison. The crushing strength was determined in this and the following Examples on prisms with edges 4·4·16 cm. long, in accordance with testing method DIN 1164.

|  | PZ 275 | Mixture (1:2) |
|---|---|---|
| Crushing strength kg./sq. cm.: |  |  |
| After 28 days | 413 | 200 |
| After 365 days | 599 | 817 |
| Heat of hydration cal./gram: |  |  |
| After 1 day | 59 | 8.8 |
| After 7 days | 79.6 | 38.4 |

EXAMPLE 2

The ground phosphorus furnace slag of Example 1 was mixed with the Portland cement "PZ 275" of Example 1, in the ratio of 1:1. The following data were obtained:

|  | PZ 275 | Mixture (1:1) |
|---|---|---|
| Crushing strength kg./sq. cm.: |  |  |
| After 28 days | 413 | 280 |
| After 365 days | 599 | 741 |
| Heat of hydration cal./gram: |  |  |
| After 1 day | 59 | 21.8 |
| After 7 days | 79.6 | 41.1 |

EXAMPLE 3

The phosphorus furnace slag of Example 1 was mixed with Portland cement "PZ 375," which had a Blaine-index of 4140 sq. cm./gram, in the ratio of 1:1. The following test data were obtained. The symbol "PZ 375" stands for a Portland cement with a crushing strength of at least 375 kg./sq. cm., after a hardening period of 28 days.

|  | PZ 375 | Mixture (1:1) |
|---|---|---|
| Crushing strength kg./sq. cm.: |  |  |
| After 28 days | 543 | 389 |
| After 365 days | 657 | 765 |
| Heat of hydration cal./gram: |  |  |
| After 1 day | 79.5 | 38.7 |
| After 7 days | 93.7 | 58.0 |

What is claimed is:

1. A cement-based hydraulic binder consisting of a mixture of a slag from electro-thermal furnace production of phosphorus in a proportion of between 15 and 70% by weight and the balance Portland cement, the slag being ground to cement fineness and containing by weight about 48% of CaO, about 42% $SiO_2$ and about 2.8% of $Al_2O_3$.

2. Massive concrete prepared with the hydraulic binder of claim 1.

References Cited

UNITED STATES PATENTS 1,326,433  10/1931  Pistor et al.

OTHER REFERENCES

Eitel: Silicate Science, vol. 5, pp. 515–516, 1966, Academic Press, New York.

JAMES E. POER, Primary Examiner

U.S. Cl. X.R.

106—97, 103, 117